United States Patent
Ropel et al.

(10) Patent No.: US 12,296,713 B2
(45) Date of Patent: May 13, 2025

(54) VEHICLE BATTERY SMART RANGE ESTIMATION AND REMOVABLE BATTERY CELL STORAGE OPTIMIZATION

(71) Applicant: Volvo Car Corporation, Gothenburg (SE)

(72) Inventors: Andreas Martin Viktor Ropel, Gothenburg (SE); Ben Peter Lloyd, Gothenburg (SE); Matthias Yannick Philippe Le Saux, Gothenburg (SE); Konstantinos Chatziioannou, Gothenburg (SE); Klas Roland Persson Signell, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 234 days.

(21) Appl. No.: 17/972,607

(22) Filed: Oct. 25, 2022

(65) Prior Publication Data

US 2024/0131959 A1 Apr. 25, 2024
US 2024/0227618 A9 Jul. 11, 2024

(51) Int. Cl.
| | |
|---|---|
| *B60L 58/12* | (2019.01) |
| *B60L 50/60* | (2019.01) |
| *B60L 53/66* | (2019.01) |
| *B60L 53/80* | (2019.01) |
| *B60L 58/16* | (2019.01) |
| *G01C 21/34* | (2006.01) |
| *H01M 10/42* | (2006.01) |
| *H01M 10/48* | (2006.01) |

(52) U.S. Cl.
CPC ............. *B60L 58/12* (2019.02); *B60L 50/60* (2019.02); *B60L 53/66* (2019.02); *B60L 53/80* (2019.02); *B60L 58/16* (2019.02); *G01C 21/34* (2013.01); *H01M 10/425* (2013.01); *H01M 10/486* (2013.01); *H01M 2010/4271* (2013.01); *H01M 2010/4278* (2013.01)

(58) Field of Classification Search
CPC .......... B60L 50/60; B60L 58/12; B60L 53/66; B60L 53/80; B60L 58/16; G01C 21/34; H01M 10/425; H01M 10/486; H01M 201/4271; H01M 2010/4278
USPC ........................................................... 701/22
See application file for complete search history.

(56) References Cited

U.S. PATENT DOCUMENTS

| | | | |
|---|---|---|---|
| 9,350,643 B2 * | 5/2016 | Wang | H04L 45/125 |
| 10,712,395 B2 * | 7/2020 | Jiang | H01M 10/44 |
| 11,415,637 B2 * | 8/2022 | Sarlashkar | G01R 31/3835 |
| 2014/0088898 A1 * | 3/2014 | Lim | G01R 31/392 |
| | | | 702/63 |

(Continued)

*Primary Examiner* — Andrew Joseph Rudy
(74) *Attorney, Agent, or Firm* — Clements Bernard Walker; Christopher L. Bernard

(57) ABSTRACT

A battery system that, based upon the state of charge (SOC), state of health (SOH), and discharge profile of a battery module, or removable cells of the battery module, apprises the user of optimal or allowable storage temperature and time before the charge and range of a fully charged battery module or removable cell is degraded. In the event that this optimal or allowable storage temperature or time is deviated from or exceeded, the battery system recalculates the necessary charging power and time to meet the original range calculation and satisfy original trip requirements. This may be utilized for cells stored both in the vehicle and cells stored remote from the vehicle.

20 Claims, 9 Drawing Sheets

(56) References Cited

U.S. PATENT DOCUMENTS

| | | | |
|---|---|---|---|
| 2022/0200312 A1* | 6/2022 | Wang | H02J 7/0048 |
| 2023/0318346 A1* | 10/2023 | Fasching | G01R 31/3835 |
| 2023/0419208 A1* | 12/2023 | Wulf | E02F 9/261 |
| 2024/0012064 A1* | 1/2024 | Lee | G01R 31/374 |
| 2024/0227617 A9* | 7/2024 | Ropel | H01M 10/425 |

* cited by examiner

VEHICLE BATTERY SMART RANGE ESTIMATION AND REMOVABLE BATTERY CELL STORAGE OPTIMIZATION

TECHNICAL FIELD

The present disclosure relates generally to the automotive field. More particularly, the present disclosure relates to a vehicle battery module with removable cells. Further, the present disclosure relates to a battery system that provides smart range estimation functionality, that uses various factors collected from the battery module and external devices. Still further, the present disclosure relates to a battery system that provides removable cell storage optimization functionality.

BACKGROUND

Conventionally, even when a vehicle does not need to utilize a full battery module and a smaller battery module would allow the vehicle to complete a desired trip, the vehicle is required to carry the full battery module, which may be heavy and inefficient to carry. Further, conventionally, battery systems do not provide a user with optimal charge and range estimates for a battery module, either on a collective or per cell basis. Still further, conventionally, battery system do not provide a user with allowable storage and idling information for a battery module.

This background is provided as illustrative environmental context only and is not intended to be limiting in any manner. It will be readily apparent to those of ordinary skill in the art that the concepts and principles of the present disclosure may be implemented in other environmental contexts equally.

SUMMARY

The present disclosure provides a battery module with removable cells and a battery management system or charging station system that determines the number of cells to use for a given trip. Thus, the system receives trip information (starting point, destination, stops, etc.) and determines the number of cells required for the trip, optionally based on traffic conditions, weather, prior driving habits, cell state of charge (SOC), cell state of health (SOH), and the like. The system can recommend which cells to leave in the vehicle, which cells to remove from the vehicle, which cells to place in the vehicle, which cells to charge, and the like. Importantly, a number of cells actually required for the trip can be suggested, without extra cells, such that extra weight in terms of unused cells may be removed from the vehicle, thereby increasing trip efficiency.

The present disclosure enables an arrangement of swappable/rentable cells, where the system dictates which cells to leave in the vehicle, which cells to remove from the vehicle, which charged swappable/rentable cells to place in the vehicle for the given trip, and where a nearby charging station is that has the required swappable/rentable cells. Likewise, the system may dictate which cells to leave in the vehicle, which cells to remove from the vehicle, which charged swappable/rentable cells to place in the vehicle for the given trip, and where charging stations are that have the required swappable/rentable cells along the route. Thus, a streamlined battery module may be modified and maintained as a trip develops, based on the charging stations available along the route in terms of the swappable/rentable cells that they have in inventory. Thus, the system is useful for taking short trips or long journeys using swappable/rentable cells.

Further, the present disclosure provides a battery system that collects and considers multiple variables to provide optimal charge and range information, either on a battery module or per cell basis. This system may provide the required charge time to complete a trip and provides a minimum SOC, which may be achieved by charging or via cell swapping. Variables considered may include expected traffic conditions for a trip, expected temperature for a trip, expected wind conditions for the trip, expected trip topography, etc., all gathered prior to the start of and/or updated during the trip. Based on this smart range estimation, the system can provide the cell swaps required, the number cells to charge, the expected charging time required, and alert the user if charge/swap related stops will be required during the trip in order to successfully complete the trip.

Still further, the present disclosure provides a battery system that, based upon the SOC, SOH, and discharge profile of a battery module, or removable cells of the battery module, apprises the user of optimal or allowable storage temperature and time before the charge and range of a fully charged battery module or removable cell is degraded. In the event that this optimal or allowable storage temperature or time is deviated from or exceeded, the battery system recalculates the necessary charging power and time to meet the original range calculation and satisfy original trip requirements. This may be utilized for cells stored both in the vehicle and cells stored remote from the vehicle.

In one illustrative embodiment, the present disclosure provides a battery module for a vehicle, including: a frame structure disposed in the vehicle; and a plurality of cells disposed in the frame structure, wherein each of the plurality of cells is removeable and replaceable. The battery module also includes a system operable for receiving trip information from a navigation system of the vehicle, a user of the vehicle, or a mobile device of the user and determining and communicating to the user of the vehicle one or more of: which of the plurality of cells are required based on the trip information; which of the plurality of cells may be removed based on the trip information; which of the plurality of cells should be replaced based on the trip information; and which of the plurality of cells should be charged based on the trip information. The trip information includes multiple of trip starting point, trip destination, and trip stops. The trip information further includes multiple of alternate routes, available charging stations, traffic conditions, weather, prior driving habits, cell state of charge (SOC), and cell state of health (SOH). The system includes one of a battery management system disposed onboard the vehicle, a charging station system disposed remote from the vehicle, and a vehicle management system disposed on the mobile device of the user. The system is further operable for determining and communicating to the user of the vehicle a location of a charging station having swappable/rentable cells suitable to replace the plurality of cells that should be replaced based on the trip information or suitable to charge the plurality of cells that should be charged based on the trip information. The battery module further includes a remote frame structure disposed adjacent to the vehicle and adapted to receive cells of the plurality of cells removed from the frame structure disposed in the vehicle. The battery module further includes a remote frame structure disposed adjacent to the vehicle and adapted to hold swappable/rentable cells to be placed in the frame structure disposed in the vehicle.

In another illustrative embodiment, the present disclosure provides a vehicle, including: a frame structure disposed in the vehicle; a plurality of cells disposed in the frame structure, wherein each of the plurality of cells is removeable and replaceable; and a system operable for receiving trip information from a navigation system of the vehicle, a user of the vehicle, or a mobile device of the user and determining and communicating to the user of the vehicle one or more of: which of the plurality of cells are required based on the trip information; which of the plurality of cells may be removed based on the trip information; which of the plurality of cells should be replaced based on the trip information; and which of the plurality of cells should be charged based on the trip information. The trip information includes multiple of trip starting point, trip destination, and trip stops. The trip information further includes multiple of alternate routes, available charging stations, traffic conditions, weather, prior driving habits, cell state of charge (SOC), and cell state of health (SOH). The system includes one of a battery management system disposed onboard the vehicle, a charging station system disposed remote from the vehicle, and a vehicle management system disposed on the mobile device of the user. The system is further operable for determining and communicating to the user of the vehicle a location of a charging station having swappable/rentable cells suitable to replace the plurality of cells that should be replaced based on the trip information or suitable to charge the plurality of cells that should be charged based on the trip information.

In a further illustrative embodiment, the present disclosure provides a method, including: providing a frame structure disposed in a vehicle; providing a plurality of cells disposed in the frame structure, wherein each of the plurality of cells is removeable and replaceable; and, via a system, receiving trip information from a navigation system of the vehicle, a user of the vehicle, or a mobile device of the user and determining and communicating to the user of the vehicle one or more of: which of the plurality of cells are required based on the trip information; which of the plurality of cells may be removed based on the trip information; which of the plurality of cells should be replaced based on the trip information; and which of the plurality of cells should be charged based on the trip information. The trip information includes multiple of trip starting point, trip destination, and trip stops. The trip information further includes multiple of alternate routes, available charging stations, traffic conditions, weather, prior driving habits, cell state of charge (SOC), and cell state of health (SOH). The system includes one of a battery management system disposed onboard the vehicle, a charging station system disposed remote from the vehicle, and a vehicle management system disposed on the mobile device of the user. The method also includes, via the system, determining and communicating to the user of the vehicle a location of a charging station having swappable/rentable cells suitable to replace the plurality of cells that should be replaced based on the trip information or suitable to charge the plurality of cells that should be charged based on the trip information. The method steps are carried out via a non-transitory computer-readable medium including instructions stored in a memory and executed by a processor to carry out the method steps.

In a still further illustrative embodiment, the present disclosure provides a battery system for a vehicle including a battery management system adapted to: obtain trip data and trip condition data including one or more of expected temperature for a trip, expected wind conditions for the trip, and expected trip topography; determine a minimum charge required for a battery module of the vehicle to complete the trip based on the trip data and the trip condition data; and communicate to a user of the vehicle one or more of the determined minimum charge required, a charging time required to reach the determined minimum charge required based on a current state of charge (SOC) of the battery module, and cells of the battery module to be replaced to achieve determined minimum charge required based on a current SOC of the cells of the battery module. The battery management system is disposed one of in the vehicle, in a cloud network, in a charging station associated with the vehicle, and in a mobile device of the user. The trip data is obtained from one of a navigation system of the vehicle and a mobile device of the user. The trip condition data is obtained from one or more of an external database, the vehicle, a charging station, another vehicle, and a mobile device of the user, coupled to the battery management system via one or more of a cloud network, a wireless link, a near-field link, and a cellular network. The trip condition data may further include expected traffic conditions for the trip and state of health (SOH) of one of more of the cells of the battery module. Optionally, one or more of the trip data and the trip condition data is updated during the trip and the minimum charge required for the battery module of the vehicle to complete the trip is re-determined based on the updated trip data and the trip condition. Optionally, the battery management system is further adapted to adjust the determined minimum charge required by a buffer amount one or more of selected by the user of the vehicle and pre-selected by the battery management system. The battery management system is further adapted to communicate to the user of the vehicle any required charging stops during the trip.

In a still further illustrative embodiment, the present disclosure provides a battery method for a vehicle, the battery method including: obtaining trip data and trip condition data including one or more of expected temperature for a trip, expected wind conditions for the trip, and expected trip topography; determining a minimum charge required for a battery module of the vehicle to complete the trip based on the trip data and the trip condition data; and communicating to a user of the vehicle one or more of the determined minimum charge required, a charging time required to reach the determined minimum charge required based on a current state of charge (SOC) of the battery module, and cells of the battery module to be replaced to achieve determined minimum charge required based on a current SOC of the cells of the battery module. The trip data is obtained from one of a navigation system of the vehicle and a mobile device of the user. The trip condition data is obtained from one or more of an external database, the vehicle, a charging station, another vehicle, and a mobile device of the user, coupled to the battery management system via one or more of a cloud network, a wireless link, a near-field link, and a cellular network. The trip condition data may further include expected traffic conditions for the trip and state of health (SOH) of one of more of the cells of the battery module. Optionally, the battery method further includes updating one or more of the trip data and the trip condition data during the trip and re-determining the minimum charge required for the battery module of the vehicle to complete the trip based on the updated trip data and the trip condition. Optionally, the battery method further includes adjusting the determined minimum charge required by a buffer amount one or more of selected by the user of the vehicle and pre-selected by the battery management system. The battery method further includes communicating to the user of the vehicle any required charging stops during the trip.

In a still further illustrative embodiment, the present disclosure provides a non-transitory computer-readable medium including instructions stored in a memory and executed by a processor to carry out steps including: obtaining trip data and trip condition data including one or more of expected temperature for a trip, expected wind conditions for the trip, and expected trip topography; determining a minimum charge required for a battery module of the vehicle to complete the trip based on the trip data and the trip condition data; and communicating to a user of the vehicle one or more of the determined minimum charge required, a charging time required to reach the determined minimum charge required based on a current state of charge (SOC) of the battery module, and cells of the battery module to be replaced to achieve determined minimum charge required based on a current SOC of the cells of the battery module. The trip data is obtained from one of a navigation system of the vehicle and a mobile device of the user. The trip condition data is obtained from one or more of an external database, the vehicle, a charging station, another vehicle, and a mobile device of the user, coupled to the battery management system via one or more of a cloud network, a wireless link, a near-field link, and a cellular network.

In a still further exemplary embodiment, the present disclosure provides a battery system for a vehicle, the battery system including a battery management system adapted to: obtain battery data including multiple of state of charge (SOC), state of health (SOH), and discharge profile data related to a battery module or a cell of the battery module; determine a storage temperature and time before an initial charge range of the battery module or cell of the battery module is/are degraded; and transmit to one or more of a user of the vehicle and a storer of the battery module or cell of the battery module one or more of: the determined storage temperature and time, whether a current temperature is a predetermined amount above/below the determined storage temperature, whether a current time exceeds the determined storage time by a predetermined amount, an impact of the current temperature on the initial charge range of the battery module or cell of the battery module, an impact of a current time on the determined storage temperature, and an impact of the current temperature on the determined storage time. The battery management system is disposed one of in the vehicle, in a cloud network, in a charging station associated with the vehicle, and in a mobile device of the user. The SOC, SOH, and discharge profile data is/are obtained from one or more of the vehicle, the battery module, the cell of the battery module, and an external database. The battery management system is further adapted to receive from the user of the vehicle or the storer of the battery module or cell of the battery module a storage temperature that differs from the determined storage temperature and calculate a necessary charging power and time to meet the initial charge range. The battery management system is further adapted to receive from the user of the vehicle or the storer of the battery module or cell of the battery module a storage time that exceeds the determined storage time and calculate a necessary charging power and time to meet the initial charge range. The battery module or removable cell of the battery module is stored within the vehicle when not in use. Alternatively, the removable cell of the battery module is stored remote from the vehicle when not in use.

In a still further exemplary embodiment, the present disclosure provides a battery method for a vehicle, the battery method including: obtaining battery data including multiple of state of charge (SOC), state of health (SOH), and discharge profile data related to a battery module or a cell of the battery module; determining a storage temperature and time before an initial charge range of the battery module or cell of the battery module is/are degraded; and transmitting to one or more of a user of the vehicle and a storer of the battery module or cell of the battery module one or more of: the determined storage temperature and time, whether a current temperature is a predetermined amount above/below the determined storage temperature, whether a current time exceeds the determined storage time by a predetermined amount, an impact of the current temperature on the initial charge range of the battery module or cell of the battery module, an impact of a current time on the determined storage temperature, and an impact of the current temperature on the determined storage time. The battery management system is disposed one of in the vehicle, in a cloud network, in a charging station associated with the vehicle, and in a mobile device of the user. The SOC, SOH, and discharge profile data is/are obtained from one or more of the vehicle, the battery module, the cell of the battery module, and an external database. The battery method further includes receiving from the user of the vehicle or the storer of the battery module or cell of the battery module a storage temperature that differs from the determined storage temperature and calculating a necessary charging power and time to meet the initial charge range. The battery method further includes receiving from the user of the vehicle or the storer of the battery module or cell of the battery module a storage time that exceeds the determined storage time and calculating a necessary charging power and time to meet the initial charge range. The battery module or removable cell of the battery module is stored within the vehicle when not in use. Alternatively, the removable cell of the battery module is stored remote from the vehicle when not in use.

In a still further exemplary embodiment, the present disclosure provides a non-transitory computer-readable medium including instructions stored in a memory and executed by a processor to carry out steps including: obtaining battery data including multiple of state of charge (SOC), state of health (SOH), and discharge profile data related to a battery module or a cell of the battery module; determining a storage temperature and time before an initial charge range of the battery module or cell of the battery module is/are degraded; and transmitting to one or more of a user of the vehicle and a storer of the battery module or cell of the battery module one or more of: the determined storage temperature and time, whether a current temperature is a predetermined amount above/below the determined storage temperature, whether a current time exceeds the determined storage time by a predetermined amount, an impact of the current temperature on the initial charge range of the battery module or cell of the battery module, an impact of a current time on the determined storage temperature, and an impact of the current temperature on the determined storage time. The SOC, SOH, and discharge profile data is/are obtained from one or more of the vehicle, the battery module, the cell of the battery module, and an external database. The steps further include receiving from the user of the vehicle or the storer of the battery module or cell of the battery module a storage temperature that differs from the determined storage temperature and calculating a necessary charging power and time to meet the initial charge range. The steps further include receiving from the user of the vehicle or the storer of the battery module or cell of the battery module a storage time that exceeds the determined storage time and calculating a necessary charging power and time to meet the initial charge range. The battery module or removable cell of the battery module is stored within the vehicle when not in use. Alternatively, the removable cell of the battery module is stored remote from the vehicle when not in use.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION

Again, the present disclosure provides a battery module with removable cells and a battery management system or charging station system that determines the number of cells to use for a given trip. Thus, the system receives trip information (starting point, destination, stops, etc.) and determines the number of cells required for the trip, optionally based on alternate routes, available charging stations, traffic conditions, weather, prior driving habits, cell state of charge (SOC), cell state of health (SOH), and the like. The system can recommend which cells to leave in the vehicle, which cells to remove from the vehicle, which cells to place in the vehicle, which cells to charge, and the like. Importantly, a number of cells actually required for the trip can be suggested, without extra cells, such that extra weight in terms of unused cells may be removed from the vehicle, thereby increasing trip efficiency.

The present disclosure enables an arrangement of swappable/rentable cells, where the system dictates which cells to leave in the vehicle, which cells to remove from the vehicle, which charged swappable/rentable cells to place in the vehicle for the given trip, and where a nearby charging station is that has the required swappable/rentable cells. Likewise, the system may dictate which cells to leave in the vehicle, which cells to remove from the vehicle, which charged swappable/rentable cells to place in the vehicle for the given trip, and where charging stations are that have the required swappable/rentable cells along the route. Thus, a streamlined battery module may be modified and maintained as a trip develops, based on the charging stations available along the route in terms of the swappable/rentable cells that they have in inventory. Thus, the system is useful for taking short trips or long journeys using swappable/rentable cells.

Figure 1:
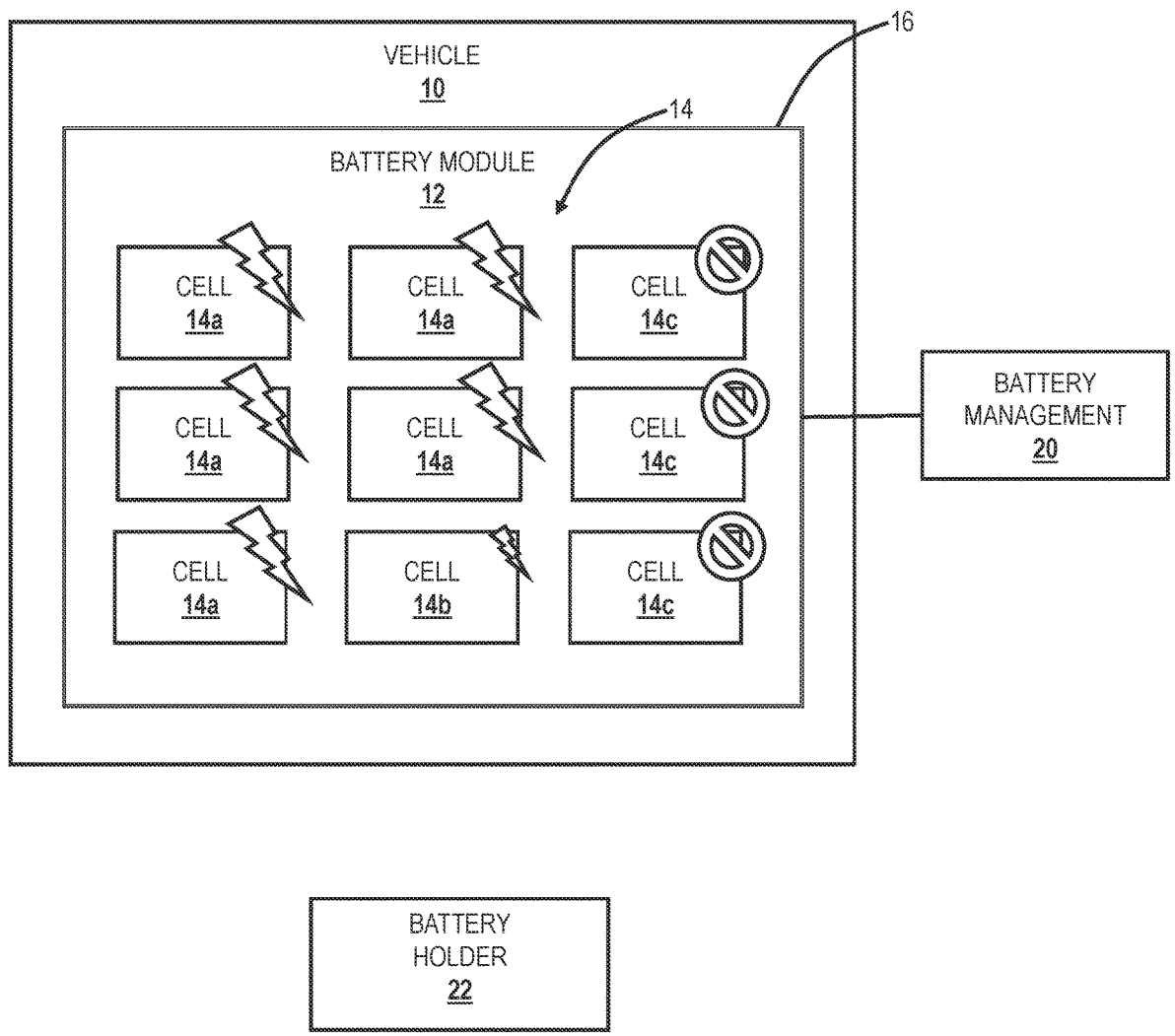
FIG. 1 is a schematic diagram illustrating one embodiment of the battery module, battery management system, and remote battery holder of the present disclosure.

FIG. 1 is a schematic diagram illustrating one embodiment of the battery module 12, battery management system 20, and remote battery holder 22 of the present disclosure. The battery module 12 includes a frame structure 16 that is disposed in a vehicle 10 and is configured to securely hold a plurality of cells 14. These cells 14 are removeable/replaceable and swappable and may each include a single battery module or a cluster of batteries in a module. Accordingly, the frame structure 16 and the plurality of cells 14 are disposed in the vehicle 10 such that they are accessible by a user. The frame structure 16 is substantially rigid and may be manufactured from a metallic material or the like. The frame structure 16 may also include structural reinforcement such that the frame structure 16 is hardened. The frame structure 16 may also include appropriate climate control structures to safeguard the plurality of cells 14, promote optimal charging and performance, etc. The status of each of the plurality of cells 14 and/or the plurality of cells 14 as a whole is/are monitored by a battery management system 20 coupled to the battery module 12.

In operation, the battery management system 20 determines which cells 14$a$ are fully charged, which cells 14$b$ are less than fully charged, and which cells 14$c$ should be replaced/swapped due to performance problems or may be removed because they are not needed for a given trip, thereby providing weight savings for the trip and promoting battery module efficiency. These aspects are described in greater detail herein below. Thus, in general, the SOC and SOH of each of the plurality of cells 14 and/or the plurality of cells 14 as a whole is/are monitored by a battery management system 20 coupled to the battery module 12. The battery module 12 and frame structure 16 provides a modular vehicle battery system, where only cells 14 that are needed may be carried, cells 14 may be selectively charged, and/or cells 14 may be swapped for better and/or charged cells 14, such as at a charging station with swappable/rentable cells 14.

Spent or unneeded cells 14 removed from the vehicle 10, and fresh/rented cells 14 to be disposed in the vehicle may be held and stored in one or more battery holders 22 disposed remote from the vehicle 10, such as in the user's home, at another location associated with the user, at a charging station, etc. The cells 14 disposed in the battery holder 22 may optionally be charged outside of the vehicle such that they are ready for subsequent use in the vehicle 10 or another vehicle.

Figure 2:
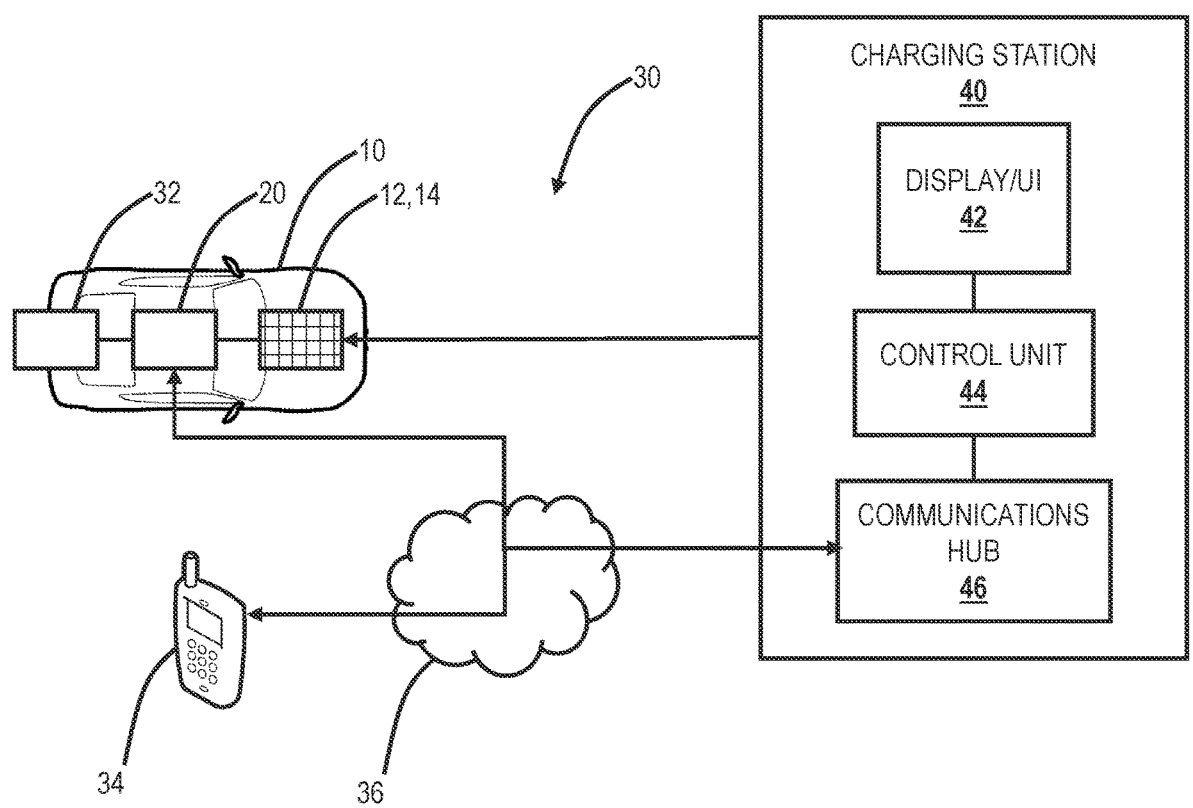
FIG. 2 is a schematic diagram illustrating one embodiment of the battery system of the present disclosure.

FIG. 2 is a schematic diagram illustrating one embodiment of the battery system 30 of the present disclosure. The system 30 is operable for receiving trip information from a navigation system 32 of the vehicle 10, the user of the vehicle 10, or a mobile device 34 of the user and determining and communicating to the user of the vehicle 10 various information related to the battery module 12, the cells thereof 14, the charging thereof, etc. Given the trip information received from the navigation system 32, the system 30, through the battery management system 20, is operable for determining which of the plurality of cells 14 are required based on the trip information, which of the plurality of cells 14 may be removed based on the trip information, which of the plurality of cells 14 should be replaced based on the trip information, and which of the plurality of cells 14 should be charged based on the trip information. The trip information includes multiple of trip starting point, trip destination, and trip stops, for example. The trip information further includes multiple of alternate routes, available charging stations, traffic conditions, weather, prior driving habits, cell/module SOC, and cell/module SOH, for example. Using the trip information, the system 30 recommends the number of cells 14 required for a given trip and recommend which cells 14 to remove from the vehicle 10, reducing the weight of the vehicle 10, promoting the efficient use of cells 14, and removing the use of unnecessary cells 14. In the event that cells 14 can be swapped or rented, the system 30 can provide the location of a charging station 40 and the availability of cells 14 at the charging station 40 for the appropriate for the trip, which is useful for both short and long trips.

The system 30 includes one or more of the battery management system 20 disposed onboard the vehicle 10, a charging station system 40 disposed remote from the vehicle 10, and a vehicle management system disposed on the mobile device 34 of the user. In general, the charging station 40 includes a display/user interface (UI) 42 by which the charging station 40 communicates with the user, a control unit 44, and a communications hub 46 by which the charging station 40 communications with the battery management system 20 of the vehicle 10 either directly, via WiFi or near-field communications, or in a networked manner via the cloud 36. The mobile device 34 also communicates with the battery management system of the vehicle 10, or with the communications hub 46 of the charging station 40, either directly, via cellular, WiFi, or near-field communications, or in a networked manner via the cloud 36.

The system 30 is further operable for determining and communicating to the user of the vehicle 10 a location of a charging station 40 having swappable/rentable cells suitable to replace the plurality of cells 14c that should be replaced based on the trip information or suitable to charge the plurality of cells 14b that should be charged based on the trip information.

Figure 3:
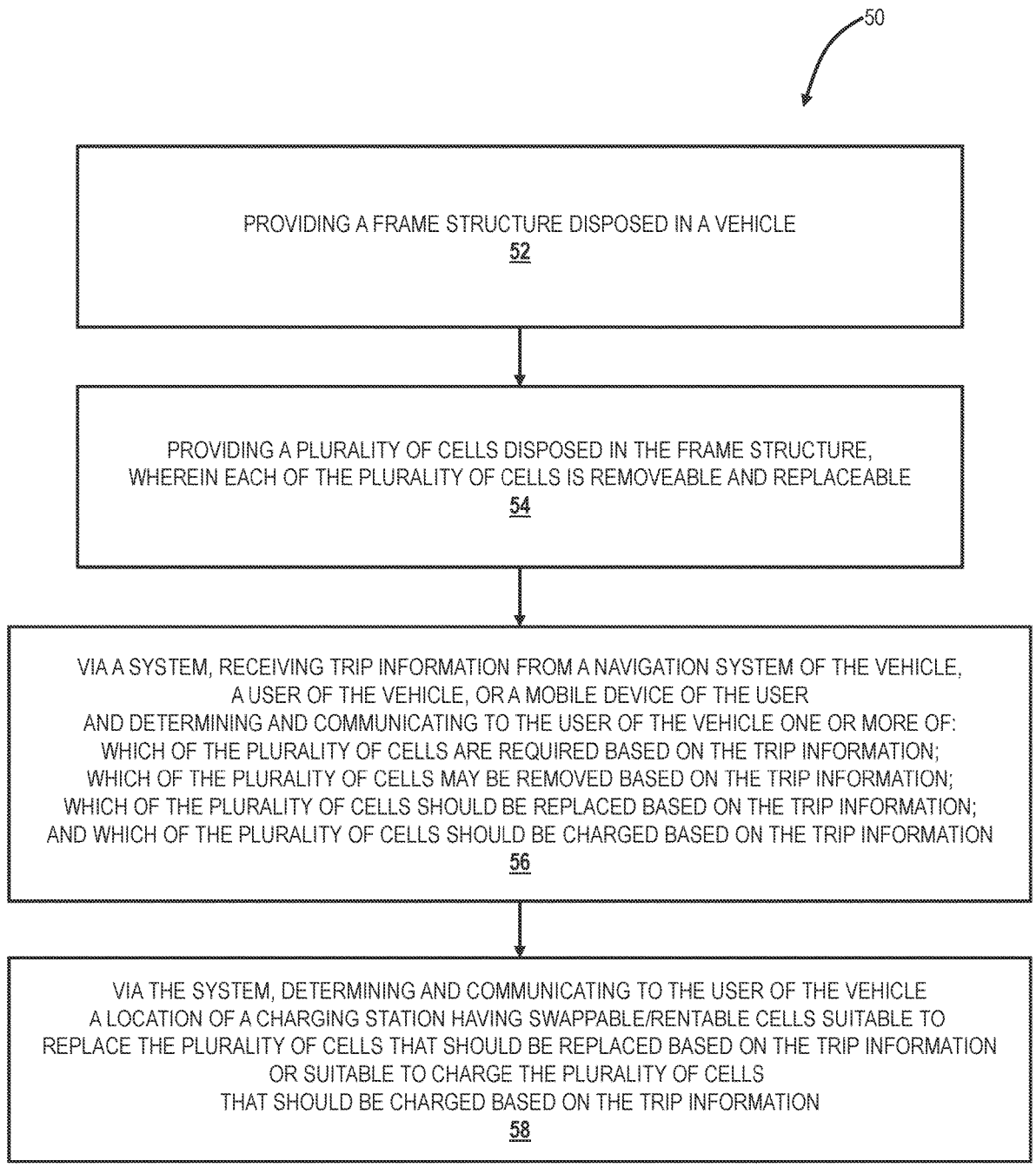
FIG. 3 is a schematic diagram illustrating one embodiment of the battery method of the present disclosure.

FIG. 3 is a schematic diagram illustrating one embodiment of the battery method 50 of the present disclosure. The method 50 includes: providing a frame structure disposed in a vehicle (step 52); providing a plurality of cells disposed in the frame structure, wherein each of the plurality of cells is removeable and replaceable (step 54); and, via a system, receiving trip information from a navigation system of the vehicle, a user of the vehicle, or a mobile device of the user and determining and communicating to the user of the vehicle one or more of: which of the plurality of cells are required based on the trip information; which of the plurality of cells may be removed based on the trip information; which of the plurality of cells should be replaced based on the trip information; and which of the plurality of cells should be charged based on the trip information (step 56). The trip information includes multiple of trip starting point, trip destination, and trip stops. The trip information further includes multiple of alternate routes, available charging stations, traffic conditions, weather, prior driving habits, cell/module SOC, and cell/module SOH. The system includes one of a battery management system disposed onboard the vehicle, a charging station system disposed remote from the vehicle, and a vehicle management system disposed on the mobile device of the user. The method also includes, via the system, determining and communicating to the user of the vehicle a location of a charging station having swappable/rentable cells suitable to replace the plurality of cells that should be replaced based on the trip information or suitable to charge the plurality of cells that should be charged based on the trip information (step 58). The method steps are carried out via a non-transitory computer-readable medium including instructions stored in a memory and executed by a processor to carry out the method steps.

Further, the present disclosure provides a battery system that collects and considers multiple variables to provide optimal charge and range information, either on a battery module or per cell basis. This system may provide the required charge time to complete a trip and provides a minimum SOC, which may be achieved by charging or via cell swapping. Variables considered may include expected traffic conditions for a trip, expected temperature for a trip, expected wind conditions for the trip, expected trip topography, etc., all gathered prior to the start of and/or updated during the trip. Based on this smart range estimation, the system can provide the cell swaps required, the number cells to charge, the expected charging time required, and alert the user if charge/swap related stops will be required during the trip in order to successfully complete the trip.

Figure 4:
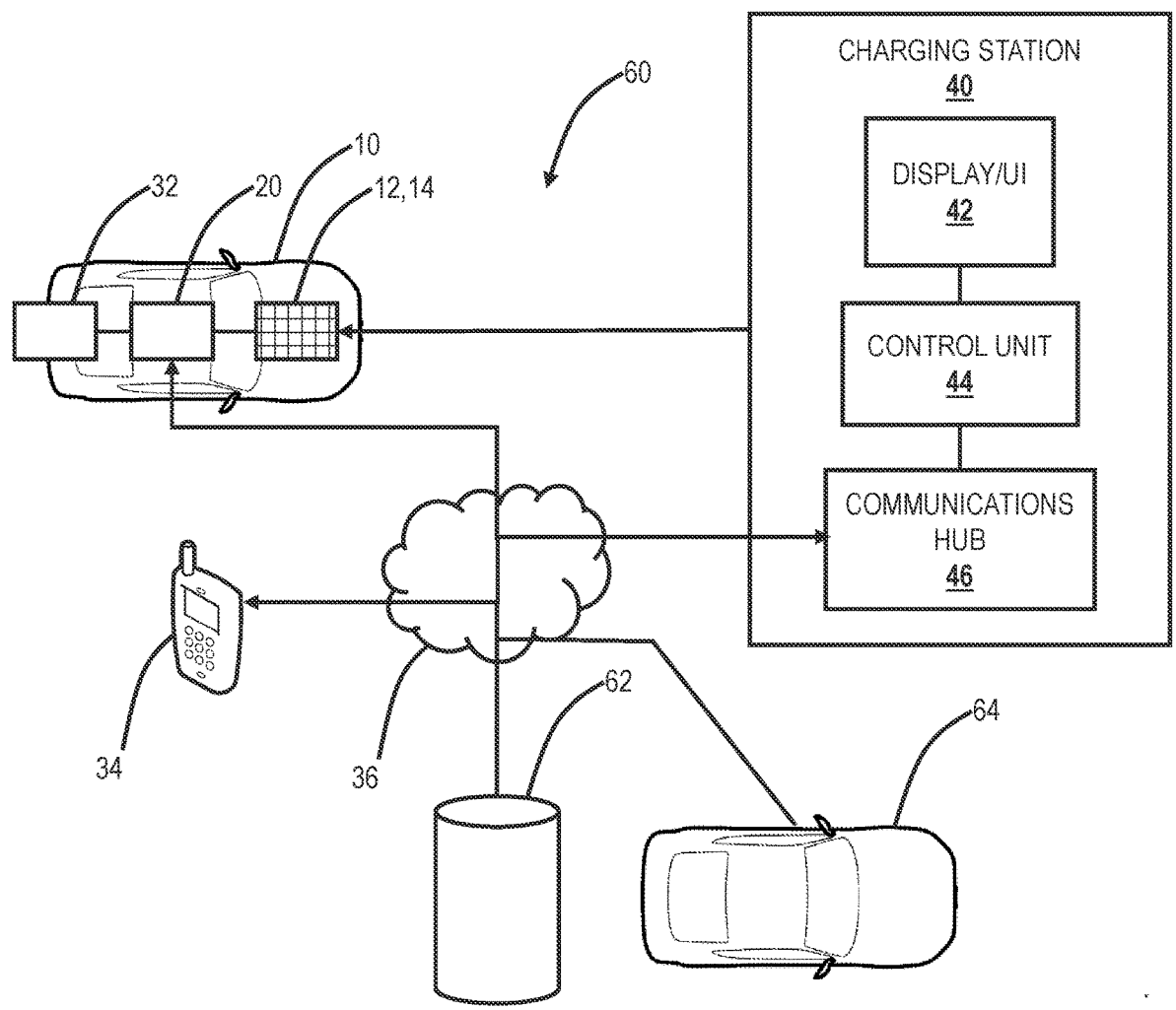
FIG. 4 is a schematic diagram illustrating one embodiment of the battery system of the present disclosure providing smart range estimation functionality.

FIG. 4 is a schematic diagram illustrating one embodiment of the battery system 60 of the present disclosure providing smart range estimation functionality. In this embodiment, the battery management system 20 collects and considers various data obtained from one or more external databases 62, the vehicle 10, one or more charging stations 40, one or more other vehicles 64, and/or the mobile device 34 of the user, all coupled to the battery management system 20 via the cloud, one or more wireless links, one or more near-field links, a cellular network, etc. The data may include, for example, the expected traffic conditions for a trip, which affects charge usage and battery SOC, the expected temperature for a trip, which affects charge usage and battery SOC and SOH, the expected wind conditions for the trip, which affects charge usage and battery SOC, and the expected trip topography, which affects charge usage and battery SOC. Using this information, the battery system 60 determines how much minimum charge is required to complete a given trip input into the navigation system 32 of the vehicle 10, the mobile device 34 of the user, or otherwise. Based on this charge information, the battery system 60, as provided herein above, can inform the user of what/how many cells 14 of the battery module 12 should be replaced/swapped, what/how many cells 14 of the battery module 12 should be charged, what charge should be applied to the battery module 12 as a whole, and/or how long any required charging is expected to take. The required minimum charge can be adjusted with buffer charge/range selected by the user and/or pre-selected by the battery system 60. This information can be shared with the charging station 40 to provide intelligent charging and/or with the mobile device 34 of the user. The user can also be alerted of expected stops that may be required during the trip to meet the minimum charging requirement, and appropriate charging stations 40 along the route may be suggested and visualized by the navigation system 32 and/or the mobile device 34 of the user.

Figure 5:
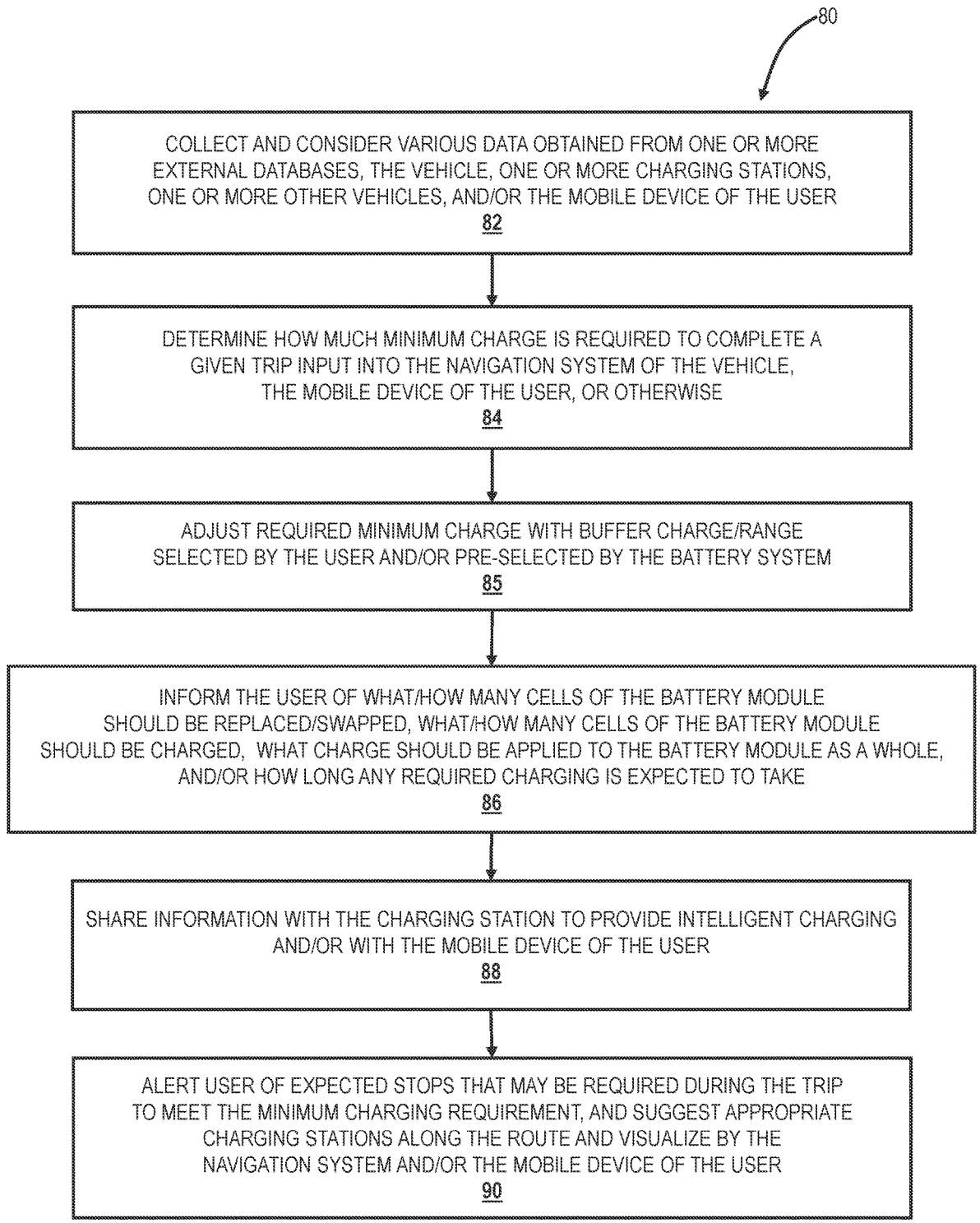
FIG. 5 is a schematic diagram illustrating one embodiment of the battery method of the present disclosure providing smart range estimation functionality.

FIG. 5 is a schematic diagram illustrating one embodiment of the battery method 80 of the present disclosure providing smart range estimation functionality. In this embodiment, the battery management system collects and considers various data obtained from one or more external databases, the vehicle, one or more charging stations, one or more other vehicles, and/or the mobile device of the user (step 82), all coupled to the battery management system via the cloud, one or more wireless links, one or more near-field links, a cellular network, etc. The data may again include, for example, the expected traffic conditions for a trip, which affects charge usage and battery SOC, the expected temperature for a trip, which affects charge usage and battery SOC and SOH, the expected wind conditions for the trip, which affects charge usage and battery SOC, and the expected trip topography, which affects charge usage and battery SOC. Using this information, the battery system determines how much minimum charge is required to complete a given trip input into the navigation system of the vehicle, the mobile device of the user, or otherwise (step 84). Based on this charge information, the battery system, as provided herein above, can inform the user of what/how many cells of the battery module should be replaced/ swapped, what/how many cells of the battery module should be charged, what charge should be applied to the battery module as a whole, and/or how long any required charging is expected to take (step 86). The required minimum charge can be adjusted with buffer charge/range selected by the user and/or pre-selected by the battery system (step 85). This information can be shared with the charging station to provide intelligent charging and/or with the mobile device of the user (step 88). The user can also be alerted of expected stops that may be required during the trip to meet the minimum charging requirement, and appropriate charging stations along the route may be suggested and visualized by the navigation system and/or the mobile device of the user (step 90). The method steps are carried out via a non-transitory computer-readable medium including instructions stored in a memory and executed by a processor to carry out the method steps.

Figure 6:
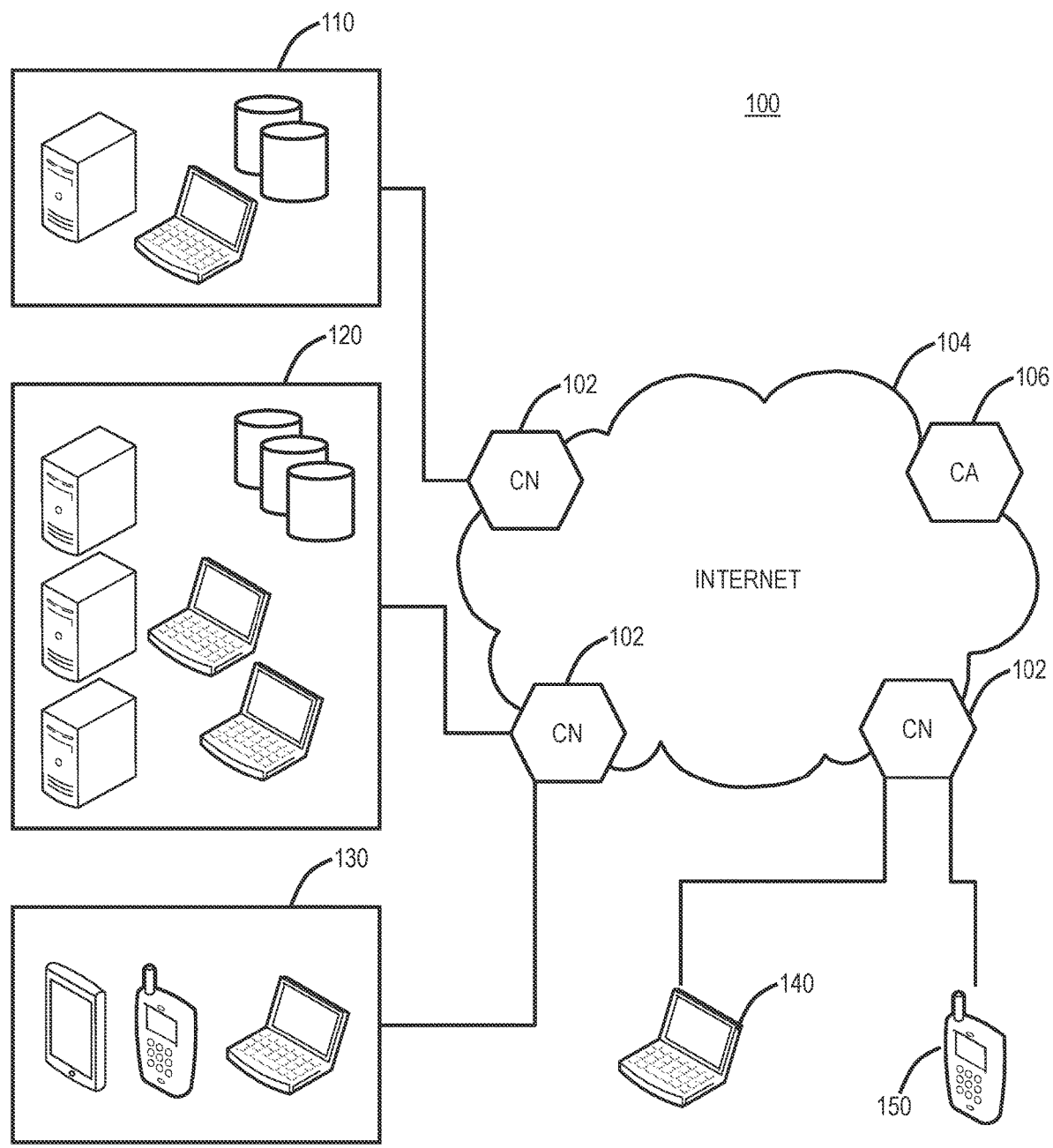
FIG. 6 is a network diagram of a cloud-based system for implementing the various algorithms and services of the present disclosure.
Figure 7:
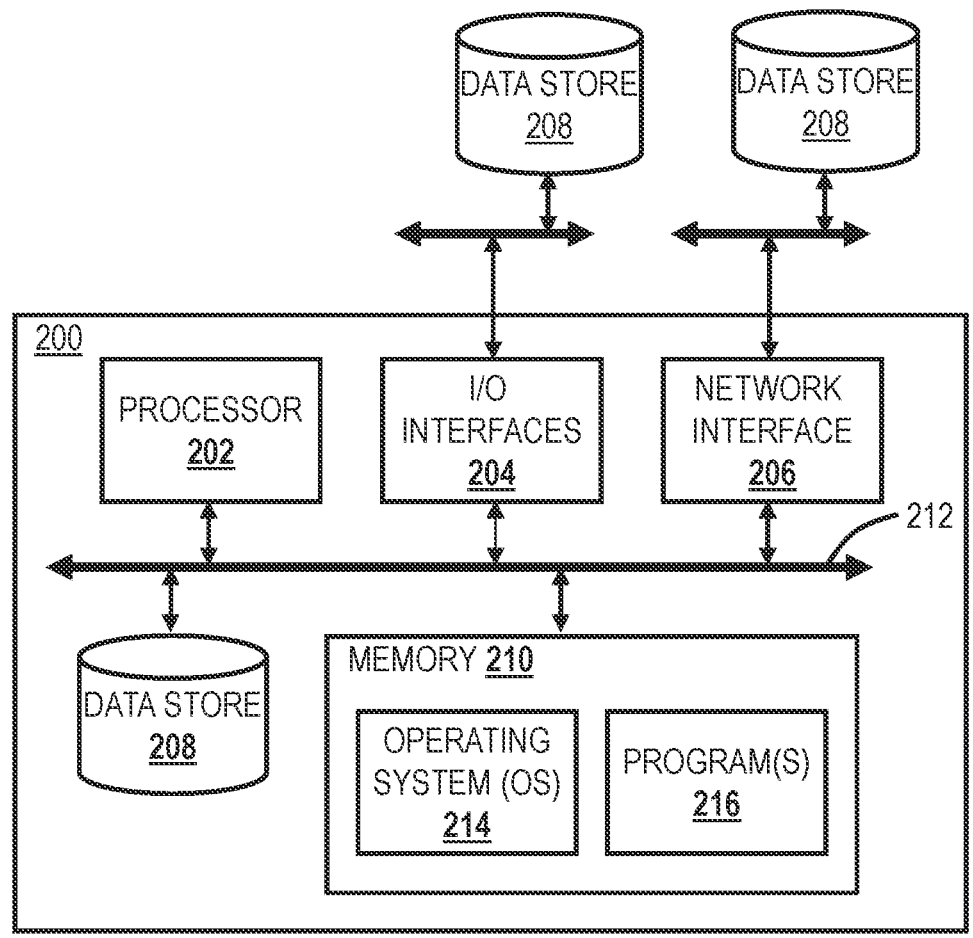
FIG. 7 is a block diagram of a server that may be used in the cloud-based system of FIG. 6 or stand-alone.

FIG. 6 is a network diagram of a cloud-based system 100 for implementing various cloud-based functions and services of the present disclosure. The cloud-based system 100 includes one or more cloud nodes (CNs) 102 communicatively coupled to the Internet 104 or the like. The cloud nodes 102 may be implemented as a server 200 (as illustrated in FIG. 7) or the like and can be geographically diverse from one another, such as located at various data centers around the country or globe. Further, the cloud-based system 100 can include one or more central authority (CA) nodes 106, which similarly can be implemented as the server 200 and be connected to the CNs 102. For illustration purposes, the cloud-based system 100 can connect to a regional office 110, headquarters 120, various employee's homes 130, laptops/desktops 140, and mobile devices 150, each of which can be communicatively coupled to one of the CNs 102. These locations 110, 120, and 130, and devices 140 and 150 are shown for illustrative purposes, and those skilled in the art will recognize there are various access scenarios to the cloud-based system 100, all of which are contemplated herein. The devices 140 and 150 can be so-called road warriors, i.e., users off-site, on-the-road, etc. The cloud-based system 100 can be a private cloud, a public cloud, a combination of a private cloud and a public cloud (hybrid cloud), or the like.

Again, the cloud-based system 100 can provide any functionality through services, such as software-as-a-service (SaaS), platform-as-a-service, infrastructure-as-a-service, security-as-a-service, Virtual Network Functions (VNFs) in a Network Functions Virtualization (NFV) Infrastructure (NFVI), etc. to the locations 110, 120, and 130 and devices 140 and 150. Previously, the Information Technology (IT) deployment model included enterprise resources and applications stored within an enterprise network (i.e., physical devices), behind a firewall, accessible by employees on site or remote via Virtual Private Networks (VPNs), etc. The cloud-based system 100 is replacing the conventional deployment model. The cloud-based system 100 can be used to implement these services in the cloud without requiring the physical devices and management thereof by enterprise IT administrators.

Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "software as a service" (SaaS) is sometimes used to describe application programs offered through cloud computing. A common shorthand for a provided cloud computing service (or even an aggregation of all existing cloud services) is "the cloud." The cloud-based system 100 is illustrated herein as one example embodiment of a cloud-based system, and those of ordinary skill in the art will recognize the systems and methods described herein are not necessarily limited thereby.

FIG. 7 is a block diagram of a server 200, which may be used in the cloud-based system 100 (FIG. 6), in other systems, or stand-alone. For example, the CNs 102 (FIG. 6) and the central authority nodes 106 (FIG. 6) may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 6 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but is not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104 (FIG. 6). The network interface 206 may include, for example, an Ethernet card or adapter (e.g., 10BaseT, Fast Ethernet, Gigabit Ethernet, or 10 GbE) or a Wireless Local Area Network (WLAN) card or adapter (e.g., 802.11a/b/g/n/ac). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., a SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

It will be appreciated that some embodiments described herein may include one or more generic or specialized processors ("one or more processors") such as microprocessors; central processing units (CPUs); digital signal processors (DSPs); customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable medium having computer-readable code stored thereon for programming a computer, server, appliance, device, processor, circuit, etc. each of which may include a processor to perform functions as described and claimed herein. Examples of such computer-readable mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Figure 8:
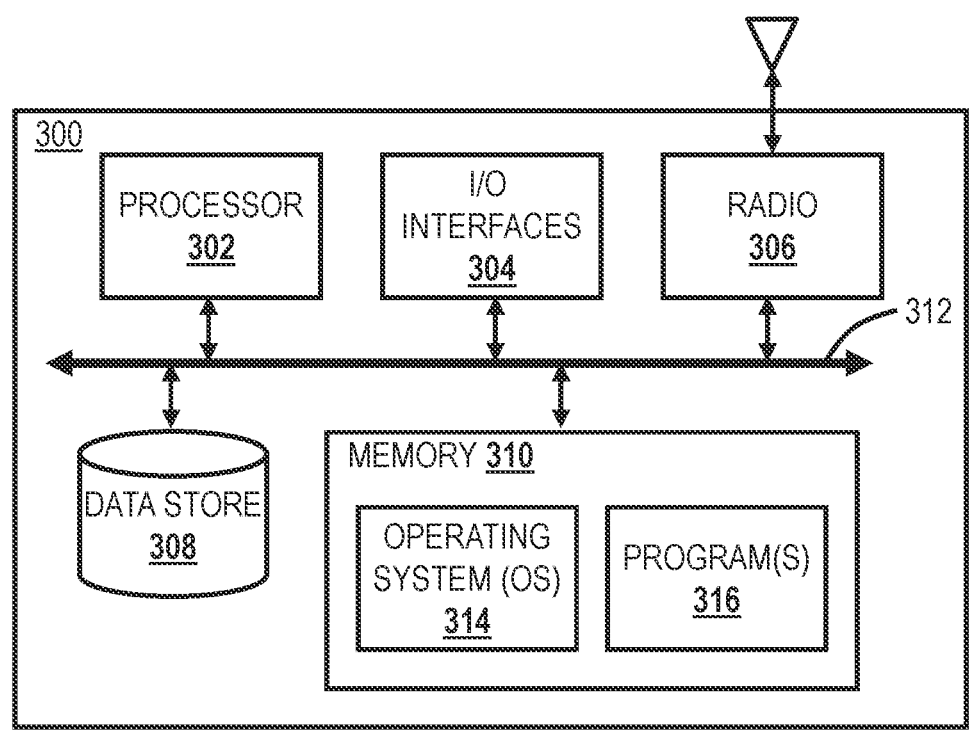
FIG. 8 is a block diagram of a user device that may be used in the cloud-based system of FIG. 6 or stand-alone.

FIG. 8 is a block diagram of a user device 300, which may be used in the cloud-based system 100 (FIG. 6), as part of a network, or stand-alone. Again, the user device 300 can be a vehicle, a smartphone, a tablet, a smartwatch, an Internet of Things (IoT) device, a laptop, a virtual reality (VR) headset, etc. The user device 300 can be a digital device that, in terms of hardware architecture, generally includes a processor 302, I/O interfaces 304, a radio 306, a data store 308, and memory 310. It should be appreciated by those of ordinary skill in the art that FIG. 7 depicts the user device 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 can be, for example, but is not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like.

System output can be provided via a display device such as a liquid crystal display (LCD), touch screen, and the like.

The radio 306 enables wireless communication to an external access device or network. Any number of suitable wireless data communication protocols, techniques, or methodologies can be supported by the radio 306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

Again, the memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 can include one or more software programs, each of which includes an ordered listing of executable instructions for implementing logical functions. In the example of FIG. 8, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end user functionality with the user device 300. For example, example programs 316 may include, but not limited to, a web browser, social networking applications, streaming media applications, games, mapping and location applications, electronic mail applications, financial applications, and the like. In a typical example, the end-user typically uses one or more of the programs 316 along with a network, such as the cloud-based system 100 (FIG. 6).

Again, the present disclosure provides a battery module with removable cells and a battery management system or charging station system that determines the number of cells to use for a given trip. Thus, the system receives trip information (starting point, destination, stops, etc.) and determines the number of cells required for the trip, optionally based on alternate routes, available charging stations, traffic conditions, weather, prior driving habits, cell SOC, cell SOH, and the like. The system can recommend which cells to leave in the vehicle, which cells to remove from the vehicle, which cells to place in the vehicle, which cells to charge, and the like. Importantly, a number of cells actually required for the trip can be suggested, without extra cells, such that extra weight in terms of unused cells may be removed from the vehicle, thereby increasing trip efficiency.

The present disclosure enables an arrangement of swappable/rentable cells, where the system dictates which cells to leave in the vehicle, which cells to remove from the vehicle, which charged swappable/rentable cells to place in the vehicle for the given trip, and where a nearby charging station is that has the required swappable/rentable cells. Likewise, the system may dictate which cells to leave in the vehicle, which cells to remove from the vehicle, which charged swappable/rentable cells to place in the vehicle for the given trip, and where charging stations are that have the required swappable/rentable cells along the route. Thus, a streamlined battery module may be modified and maintained as a trip develops, based on the charging stations available along the route in terms of the swappable/rentable cells that they have in inventory. Thus, the system is useful for taking short trips or long journeys using swappable/rentable cells.

Further, the present disclosure provides a battery system that collects and considers multiple variables to provide optimal charge and range information, either on a battery module or per cell basis. This system may provide the required charge time to complete a trip and provides a minimum SOC, which may be achieved by charging or via cell swapping. Variables considered may include expected traffic conditions for a trip, expected temperature for a trip, expected wind conditions for the trip, expected trip topography, etc., all gathered prior to the start of and/or updated during the trip. Based on this smart range estimation, the system can provide the cell swaps required, the number cells to charge, the expected charging time required, and alert the user if charge/swap related stops will be required during the trip in order to successfully complete the trip.

Still further, the present disclosure provides a battery system that, based upon the SOC, SOH, and discharge profile of a battery module, or removable cells of the battery module, apprises the user of optimal or allowable storage temperature and time before the charge and range of a fully charged battery module or removable cell is degraded. In the event that this optimal or allowable storage temperature or time is deviated from or exceeded, the battery system recalculates the necessary charging power and time to meet the original range calculation and satisfy original trip requirements. This may be utilized for cells stored both in the vehicle and cells stored remote from the vehicle.

Referring again to FIG. 4, the battery system 60 and battery management system 20 obtains SOC, SOH, and discharge profile data related to the battery module 12, or removable cells 14 of the battery module 14, from the vehicle 10 and the battery module 12 or removable cells 14 of the battery module and/or one or more external databases 62, all coupled to the battery management system 20 via the cloud, one or more wireless links, one or more near-field links, a cellular network, etc. Using this information, the battery system 60 apprises the user of optimal or allowable storage temperature and time before the charge and range of the battery module 12 or removable cells 14 of the battery module 12 are degraded. This may be utilized for cells 14 stored both in the vehicle 10, but unused, and cells 14 stored remote from the vehicle 10. In the event that this optimal or allowable storage temperature or time is deviated from or exceeded, the battery system 60 recalculates the necessary charging power and time to meet the original range calculation and satisfy original trip requirements, as provided herein.

Figure 9:
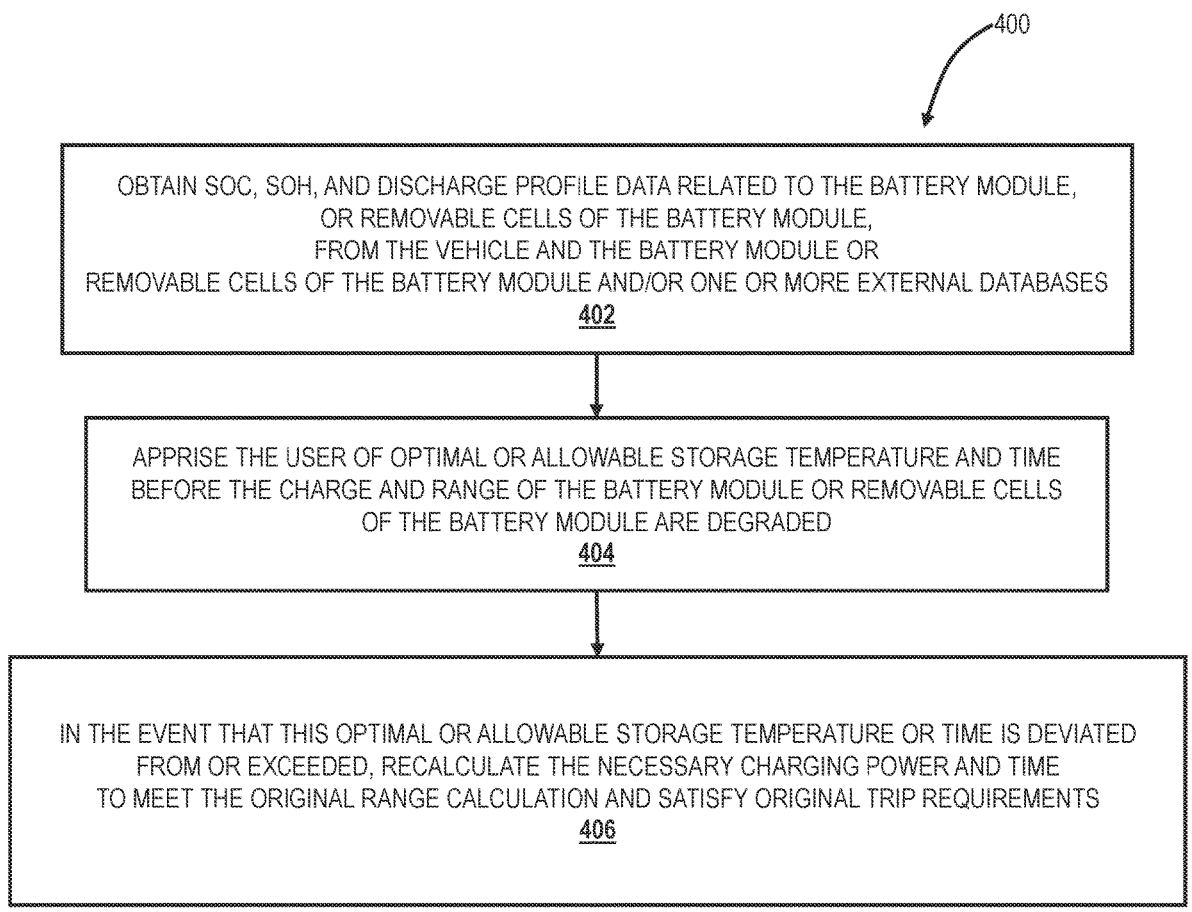
FIG. 9 is a schematic diagram illustrating one embodiment of the battery method of the present disclosure providing smart storage estimation functionality.

FIG. 9 is a schematic diagram illustrating one embodiment of the battery method 400 of the present disclosure providing smart storage estimation functionality. The battery method 400 includes obtaining SOC, SOH, and discharge profile data related to the battery module, or removable cells of the battery module, from the vehicle and the battery module or removable cells of the battery module and/or one or more external databases (step 402), all coupled to the battery management system via the cloud, one or more wireless links, one or more near-field links, a cellular network, etc. Using this information, the battery system apprises the user of optimal or allowable storage temperature and time before the charge and range of the battery module or removable cells of the battery module are degraded (step 404). This may be utilized for cells stored both in the vehicle, but unused, and cells stored remote from the vehicle. In the event that this optimal or allowable storage temperature or time is deviated from or exceeded, the battery system recalculates the necessary charging power and time to meet the original range calculation and satisfy original trip requirements (step 406), as provided herein.

By way of example, if a vehicle is stored in a garage and there is trip scheduled for tomorrow and the user is notified that X cells can be removed and Y cells should be kept, because temperature impacts range, if the temperature in the garage changes, the user may be notified that more X cells need to be added back given the temperature change. Thus, in the event that recommended storage conditions are not maintained, the system recalculates and may provide recharging time and power to meet an original range calculation.

Although the present disclosure is illustrated and described herein with reference to illustrative embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. A battery system for a vehicle, the battery system comprising:
   a battery management system adapted to:
      obtain battery data comprising multiple of state of charge (SOC), state of health (SOH), and discharge profile data related to a battery module or a cell of the battery module;
      determine a storage temperature and time before an initial charge range of the battery module or cell of the battery module is/are degraded; and
      transmit to either or both of a user of the vehicle and a storer of the battery module or cell of the battery module at least one of the following: the determined storage temperature and time, whether a current temperature is a predetermined amount above/below the determined storage temperature, whether a current time exceeds the determined storage time by a predetermined amount, an impact of the current temperature on the initial charge range of the battery module or cell of the battery module, an impact of a current time on the determined storage temperature, and an impact of the current temperature on the determined storage time.

2. The battery system of claim 1, wherein the battery management system is disposed in the vehicle, in a cloud network, in a charging station associated with the vehicle, or in a mobile device of the user.

3. The battery system of claim 1, wherein the SOC, SOH, and discharge profile data is/are obtained from at least one of the following: the vehicle, the battery module, the cell of the battery module, and an external database.

4. The battery system of claim 1, wherein the battery management system is further adapted to receive from the user of the vehicle or the storer of the battery module or cell of the battery module a storage temperature that differs from the determined storage temperature and calculate a necessary charging power and time to meet the initial charge range.

5. The battery system of claim 1, wherein the battery management system is further adapted to receive from the user of the vehicle or the storer of the battery module or cell of the battery module a storage time that exceeds the determined storage time and calculate a necessary charging power and time to meet the initial charge range.

6. The battery system of claim 1, wherein the battery module or removable cell of the battery module is stored within the vehicle when not in use.

7. The battery system of claim 1, wherein the removable cell of the battery module is stored remote from the vehicle when not in use.

8. A battery method for a vehicle, the battery method comprising:
   obtaining battery data comprising multiple of state of charge (SOC), state of health (SOH), and discharge profile data related to a battery module or a cell of the battery module;
   determining a storage temperature and time before an initial charge range of the battery module or cell of the battery module is/are degraded; and
   transmitting to either or both of a user of the vehicle and a storer of the battery module or cell of the battery module at least one of the following: the determined storage temperature and time, whether a current temperature is a predetermined amount above/below the determined storage temperature, whether a current time exceeds the determined storage time by a predetermined amount, an impact of the current temperature on the initial charge range of the battery module or cell of the battery module, an impact of a current time on the determined storage temperature, and an impact of the current temperature on the determined storage time.

9. The battery method of claim 8, wherein the battery management system is disposed in the vehicle, in a cloud network, in a charging station associated with the vehicle, or in a mobile device of the user.

10. The battery method of claim 8, wherein the SOC, SOH, and discharge profile data is/are obtained from at least one of the following: the vehicle, the battery module, the cell of the battery module, and an external database.

11. The battery method of claim 8, further comprising receiving from the user of the vehicle or the storer of the battery module or cell of the battery module a storage temperature that differs from the determined storage temperature and calculating a necessary charging power and time to meet the initial charge range.

12. The battery method of claim 8, further comprising receiving from the user of the vehicle or the storer of the battery module or cell of the battery module a storage time that exceeds the determined storage time and calculating a necessary charging power and time to meet the initial charge range.

13. The battery method of claim 8, wherein the battery module or removable cell of the battery module is stored within the vehicle when not in use.

14. The battery method of claim 8, wherein the removable cell of the battery module is stored remote from the vehicle when not in use.

15. A non-transitory computer-readable medium comprising instructions stored in a memory and executed by a processor to carry out steps comprising:
   obtaining battery data comprising multiple of state of charge (SOC), state of health (SOH), and discharge profile data related to a battery module or a cell of the battery module;

determining a storage temperature and time before an initial charge range of the battery module or cell of the battery module is/are degraded; and transmitting to either or both of a user of the vehicle and a storer of the battery module or cell of the battery module at least one of the following: the determined storage temperature and time, whether a current temperature is a predetermined amount above/below the determined storage temperature, whether a current time exceeds the determined storage time by a predetermined amount, an impact of the current temperature on the initial charge range of the battery module or cell of the battery module, an impact of a current time on the determined storage temperature, and an impact of the current temperature on the determined storage time.

16. The non-transitory computer-readable medium of claim 15, wherein the SOC, SOH, and discharge profile data is/are obtained from at least one of the following: the vehicle, the battery module, the cell of the battery module, and an external database.

17. The non-transitory computer-readable medium of claim 15, the steps further comprising receiving from the user of the vehicle or the storer of the battery module or cell of the battery module a storage temperature that differs from the determined storage temperature and calculating a necessary charging power and time to meet the initial charge range.

18. The non-transitory computer-readable medium of claim 15, the steps further comprising receiving from the user of the vehicle or the storer of the battery module or cell of the battery module a storage time that exceeds the determined storage time and calculating a necessary charging power and time to meet the initial charge range.

19. The non-transitory computer-readable medium of claim 15, wherein the battery module or removable cell of the battery module is stored within the vehicle when not in use.

20. The non-transitory computer-readable medium of claim 15, wherein the removable cell of the battery module is stored remote from the vehicle when not in use.

* * * * *